(12) United States Patent
Aoki et al.

(10) Patent No.: US 8,407,996 B2
(45) Date of Patent: Apr. 2, 2013

(54) COMMON RAIL AND METHOD OF MANUFACTURING COMMON RAIL

(75) Inventors: Tomohiro Aoki, Saitama (JP); Masaki Shiwa, Saitama (JP); Kazuhisa Taira, Saitama (JP)

(73) Assignee: Bosch Corporation, Tokyo (JP)

( * ) Notice: Subject to any disclaimer, the term of this patent is extended or adjusted under 35 U.S.C. 154(b) by 1013 days.

(21) Appl. No.: 12/446,082

(22) PCT Filed: Oct. 16, 2007

(86) PCT No.: PCT/JP2007/070159
§ 371 (c)(1),
(2), (4) Date: Apr. 17, 2009

(87) PCT Pub. No.: WO2008/050633
PCT Pub. Date: May 2, 2008

(65) Prior Publication Data
US 2010/0212313 A1    Aug. 26, 2010

(30) Foreign Application Priority Data

Oct. 23, 2006   (JP) ................................ 2006-287253
Aug. 31, 2007   (JP) ................................ 2007-225448

(51) Int. Cl.
*F15B 7/08*       (2006.01)
(52) U.S. Cl. ........................................................ 60/588
(58) Field of Classification Search ...................... 60/588
See application file for complete search history.

(56) References Cited

U.S. PATENT DOCUMENTS

| 6,272,858 | B1 | 8/2001 | Takano et al. |
| 2005/0115237 | A1 | 6/2005 | Tsubouchi et al. |
| 2006/0219507 | A1* | 10/2006 | Drott et al. ............... 188/322.17 |

FOREIGN PATENT DOCUMENTS

| EP | 1616768 A1 | 1/2006 |
| JP | 2000108878 A | 4/2000 |
| JP | 2003194100 A | 7/2003 |
| JP | 2005186925 A | 7/2005 |
| JP | 2005273714 A | 10/2005 |
| WO | 2005019007 A1 | 3/2005 |

* cited by examiner

*Primary Examiner* — Michael Leslie
(74) *Attorney, Agent, or Firm* — Michael Best & Friedrich LLP

(57) ABSTRACT

A projection ($21b_4$) provided at a tip portion of an inner lip portion ($21b$) of a first cup seal (21) comes in contact with a second side wall (20c) of a recessed portion (20) and a large axial force is exerted in the axial direction on a first tapered inner peripheral surface ($21b_1$) of the first cup seal (21) from a rear side tapered surface ($4b_2$) of a primary piston (4). This makes it possible to reliably hold the first cup seal (21) in the axial direction by utilizing the axial force. Therefore, the first cup seal (21) can be suppressed from moving in the axial direction. In particular, the projection ($21b_4$) of the first cup seal (21) comes in contact with a tapered surface (20c') of the second side wall (20c) to obtain a further increased axial force, and the first cup seal (21) can be held more reliably.

8 Claims, 7 Drawing Sheets

FIG2
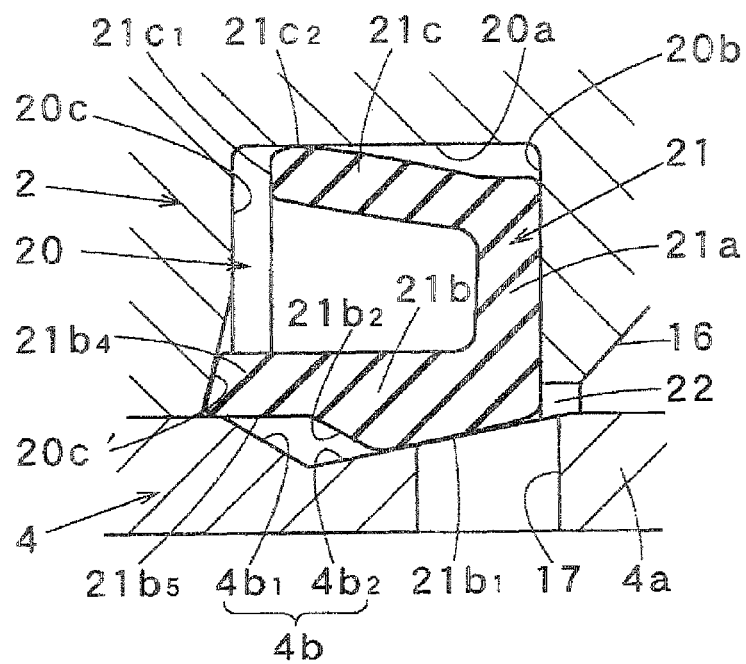
(a)
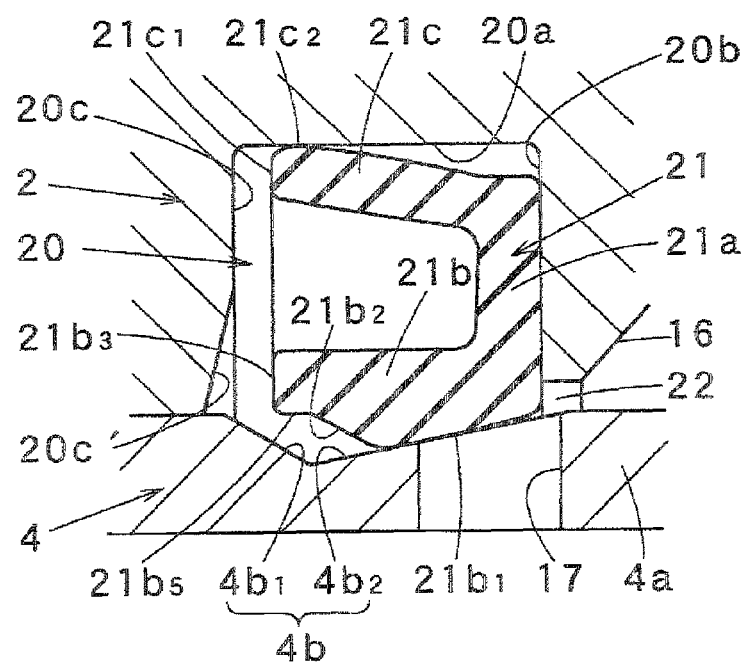
(b)

Fig9
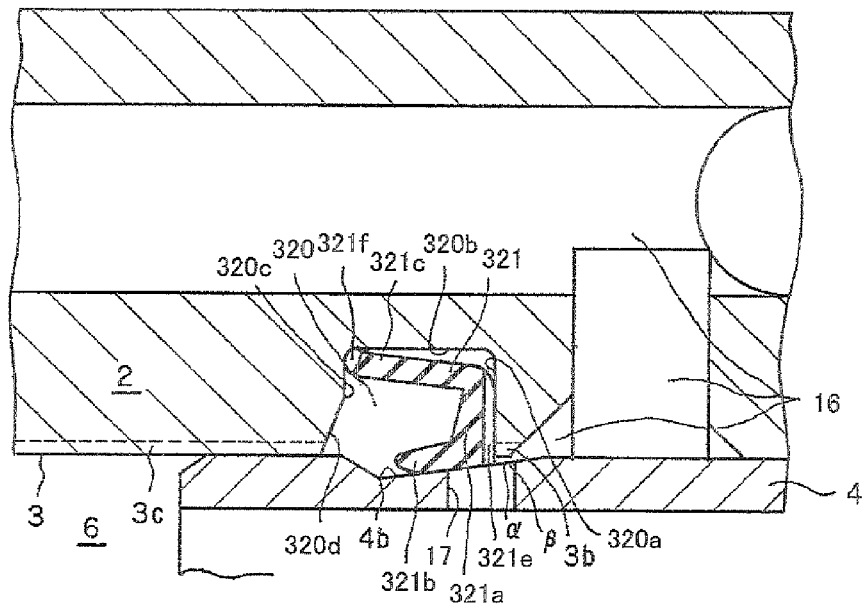
(a)
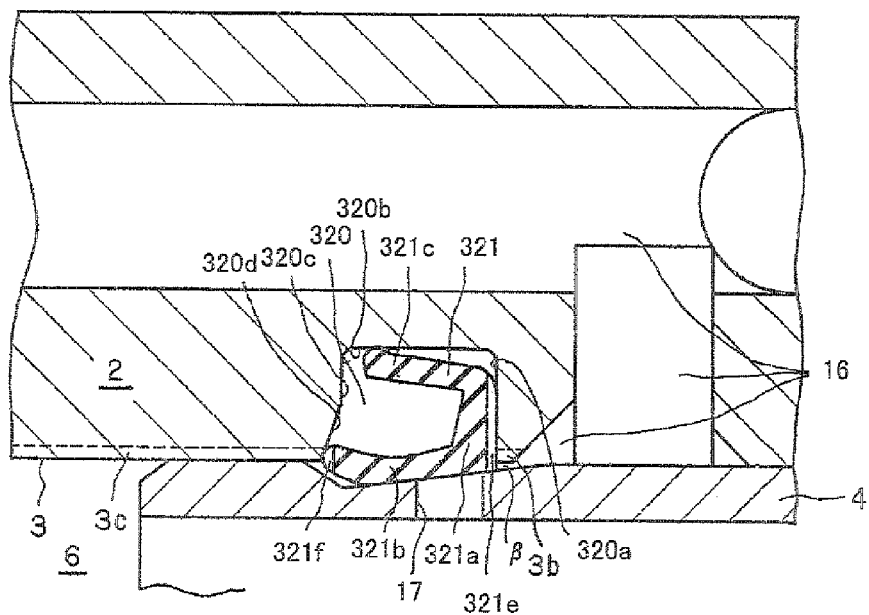
(b)

US 8,407,996 B2

COMMON RAIL AND METHOD OF MANUFACTURING COMMON RAIL

TECHNICAL FIELD

This invention relates to a technical field of a cup seal used for a cylinder device including a cylinder such as a master cylinder of a brake or a clutch and a slide member arranged in the cylinder so as to undergo a relative motion in the axial direction thereof, and a master cylinder of the plunger type equipped with the cup seal in a vehicle such as automobile.

BACKGROUND ART

Hydraulic brake systems and hydraulic clutch systems for automobiles are conventionally employing a master cylinder that generates a hydraulic pressure depending upon the force of depressing a brake pedal or a clutch pedal to operate the brake or the clutch. As the master cylinder, there has been known a plunger type master cylinder including a cylinder body having a cylinder hole, a piston inserted in the cylinder hole so as to slide therein to divide the hydraulic chamber, a connecting passage provided in the cylinder body to be connected to the reservoir, a relief port formed in the piston to connect the connecting passage and the hydraulic chamber together, and a seal member held in a recessed portion in the inner peripheral surface of the cylinder hole of the cylinder body and through which the piston penetrates so as to slide while attaining the sealing between the inner peripheral surface of the cylinder hole and the outer peripheral surface of the piston (see, for example, Patent document 1 to Patent document 3).

According to the plunger type master cylinders disclosed in the Patent document 1 and Patent document 2, when not in operation, the relief port of the piston is not shut off from the connecting passage by the seal member, and the hydraulic chamber is connected to the reservoir through the relief port and the connecting passage. When not in operation, therefore, the interior of the hydraulic chamber assumes the atmospheric pressure, and no hydraulic pressure is generated. If the piston advances toward the hydraulic chamber as a result of depressing the brake pedal or the clutch pedal, the relief port is shut off from the connecting passage by the seal member, and the hydraulic chamber is shut off from the reservoir. As the piston advances, therefore, a hydraulic pressure generates in the hydraulic chamber.

The seal member used for the plunger type master cylinder, usually, must satisfy a sealing performance for preventing the leakage of hydraulic pressure that generates when the piston advances and a pumping performance which is a fluid feed function for feeding the brake fluid in the reservoir into the hydraulic chamber to improve response when the piston retracts. In order for the seal member to exhibit the above two performances, therefore, a cup seal has been employed so as to work as the seal member. The cup seal is formed in a U-shape in cross section including a circular base portion extending in the radial direction, an inner lip portion extending in the axial direction from the inner peripheral end of the base portion, and an outer lip portion extending in the axial direction from the outer peripheral end of the base portion.

When a hydraulic pressure is generated in the hydraulic chamber, the inner lip portion closely contacts to the outer peripheral surface of the piston due to the hydraulic pressure and the outer lip portion closely adheres to the bottom wall of the recessed portion in which the seal member is held due to the hydraulic pressure. Therefore, the seal member accomplishes a liquid-tight sealing between the outer peripheral surface of the piston and the inner peripheral surface of the cylinder hole.

Further, when the piston retracts after having generated the hydraulic pressure, the volume in the hydraulic chamber increases and the pressure in the hydraulic chamber so decreases as to turn into a negative pressure. Therefore, the inner lip portion deflects outward and separates away from the outer peripheral surface of the piston to form a gap. Moreover, the outer lip portion deflects inward and separates away from the bottom wall of the recessed portion to form a gap. Accordingly, the brake fluid in the reservoir is fed through the gaps into the hydraulic chamber enabling the piston to retract smoothly and quickly.

Patent document 1: JP-A-2000-108878
Patent document 2: JP-A-2005-273714
Patent document 3: JP-A-2003-194100

DISCLOSURE OF THE INVENTION

Problems to be Solved by the Invention

According to the cup seal disclosed in Patent document 1, however, the inner lip portion is brought into contact with the side wall of the recessed portion over the whole circumference thereof. Therefore, though the cup seal is prevented from moving in the axial direction, there is a problem in that it is difficult to feed the fluid to a sufficient degree from the inner lip side.

According to the cup seal disclosed in Patent document 2, on the other hand, gaps are formed between the inner lip portion and the side wall of the recessed portion and between the base portion and the side wall of the recessed portion, respectively. Therefore, though the fluid can be supplied to a sufficient degree from the inner lip side, it is difficult to prevent the cup seal from moving in the axial direction.

According to the cup seal of the above Patent document 3, further, if the piston operates in a state where the pressure in the pressure chamber at the time of depressing the pedal is not so elevated, the seal member moves together with the piston causing an increased loss since there is a gap between the front part of the seal member and the housing.

The present invention was accomplished in view of the above circumstances and its object is to provide a cup seal which is capable of more reliably preventing the motion in the axial direction while attaining the above sealing performance and the pumping performance.

Another object of the present invention is to provide a master cylinder which decreases the loss of stability of operation and loss of force, reliably generates the hydraulic pressure, and further improves the response at the time when the piston retracts.

Means for Solving the Problems

In order to solve the above problems, a cup seal of the invention is a cup seal held in a recessed portion and formed in a U-shape in cross section, comprising an annular base portion extending in the radial direction and through which a slide member penetrates so as to slide; an annular inner lip portion extending in the axial direction from an inner peripheral end of the base portion and through which the slide member penetrates so as to slide; and an annular outer lip portion extending in the axial direction from an outer peripheral end of the base portion and coming in detachable contact with the bottom wall of the recessed portion; wherein the inner lip portion has an inner peripheral surface which at least includes a first tapered inner peripheral surface which extends in a manner that the inner diameter thereof gradually decreases forward in the axial direction from the inner peripheral end of the base portion and a second tapered inner peripheral surface which extends in a manner that the inner diameter thereof gradually increases forward in the axial direction from the first tapered inner peripheral surface; and a projection protrudes in the axial direction at the tip portion of the inner lip portion so as to determine the position in the axial direction when the tip portion of the inner lip portion comes in contact with the opposing side wall of the recessed portion.

The cup seal of the invention is characterized in that the inner peripheral surface has the second tapered inner peripheral surface which extends in a manner that the inner diameter thereof gradually increases forward in the axial direction from the first tapered inner peripheral surface.

The cup seal of the invention is characterized in that the open end portion of the side wall of the recessed portion to which the projection comes in contact, has a tapered surface that expands toward the open end, and the projection is held in the recessed portion.

Further, a master cylinder of the invention comprises a cylinder body having a cylinder hole; a piston inserted in the cylinder hole so as to slide to thereby divide a hydraulic chamber; a connecting passage provided in the cylinder body to be connected to a reservoir; a relief port formed in the piston, connected to the hydraulic chamber at all times and connecting the connecting passage to the hydraulic chamber; and a seal member held in a cylinder-side recessed portion in the inner peripheral surface of the cylinder hole of the cylinder body and through which the piston penetrates so as to slide while attaining the sealing between the inner peripheral surface of the cylinder hole and the outer peripheral surface of the piston, enabling the connecting passage to be connected to the relief port when not in operation and, when in operation, causing the piston to move so that the connecting passage is shut off from the relief port by the seal member; wherein a piston-side recessed portion having a tapered surface is formed in the outer peripheral surface of the piston; the seal member is constituted by the cup seal; and the projection of the inner lip portion comes in contact with the side wall of the recessed portion to which the tip portion of the inner lip portion faces, whereby the cup seal is positioned in the axial direction while being prevented from moving in the axial direction, and the tapered surface of the piston-side recessed portion is allowed to come in contact with the first tapered inner surface of the inner lip portion in the axial direction.

The master cylinder of the invention is characterized in that the open end portion of the side wall of the recessed portion to which the projection comes in contact, has a tapered surface that expands toward the open end, and the projection comes in contact with the tapered surface.

In order to solve the above problems, further, a master cylinder of the invention comprises a cylinder body having a cylinder hole; a piston inserted in the cylinder hole so as to slide to thereby divide a hydraulic chamber; a connecting passage provided in the cylinder body to be connected to a reservoir; a relief port formed in the piston, connected to the hydraulic chamber at all times and connecting the connecting passage to the hydraulic chamber; and a seal member held in a recessed portion in the inner peripheral surface of the cylinder hole of the cylinder body and through which the piston penetrates so as to slide while attaining the sealing between the inner peripheral surface of the cylinder hole and the outer peripheral surface of the piston, enabling the connecting passage to be connected to the relief port when not in operation and, when in operation, causing the piston to move so that the connecting passage is shut off from the relief port by the seal member; wherein the seal member has a base portion that comes in contact with the base portion-side wall of the recessed portion in the inner peripheral surface of the cylinder hole of the cylinder body and, further, has at least one lip portion with an interference that comes in contact with the lip portion-side wall of the recessed portion in the inner peripheral surface of the cylinder hole of the cylinder body at all times.

Further, the master cylinder of the invention is characterized in that the lip portion-side wall of the recessed portion in the inner peripheral surface of the cylinder hole of the cylinder body has a tapered portion formed in a tapered shape.

Further, the master cylinder of the invention is characterized in that the tapered portion is so formed that a gap between the base portion-side wall and the lip portion-side wall becomes narrow toward the bottom wall of the recessed portion.

Further, the master cylinder of the invention is characterized in that the seal member is a cup seal of nearly an E-shape in cross section, and the cup seal of the E-shape is provided with an intermediate lip portion having an interference that comes in contact with the lip portion-side wall.

Further, the master cylinder of the invention is characterized in that the interference of the intermediate lip portion is partly arranged in the circumferential direction.

Effects of the Invention

According to the cup seal of the invention constituted as described above, the projection provided at the tip portion of the inner lip portion comes in contact with the side wall of the recessed portion, and a large axial force is exerted on the first tapered inner peripheral surface of the cup seal in the axial direction making it possible to reliably hold the cup seal in the axial direction relying on the axial force. Therefore, the cup seal is suppressed from moving in the axial direction. In particular, with the projection of the cup seal being in contact with the tapered surface of the side wall of the recessed portion, a further increased axial force is obtained, and the cup seal can be more reliably held.

Concerning the base portion, further, when the hydraulic pressure generates on the inner lip side, the outer lip portion closely contacts to the bottom wall of the recessed portion and the base portion closely contacts to the side wall of the recessed portion, preventing the hydraulic pressure from leaking. Further, when the hydraulic fluid is being fed, the outer lip portion separates away from the bottom wall of the recessed portion and the base portion separates away from the side wall of the recessed portion, permitting the hydraulic pressure to be fed. Thus, the cup seal of the invention can be prevented from moving in the axial direction while maintaining performance for sealing the hydraulic pressure and the pumping performance for feeding the hydraulic fluid.

According to the master cylinder using the cup seal of the present invention, on the other hand, the cup seal can be held by the axial force of the piston. Therefore, the cup seal is prevented from moving in the axial direction. This makes it possible to suppress an ineffective stroke of the piston. When the piston moves forward, therefore, a hydraulic pressure can quickly generate in the hydraulic chamber and increase therein. This enables the response of the master cylinder at the time of commencing the operation to be improved.

Particularly, with the projection of the cup seal in contact with the tapered surface of the side wall of the recessed portion, the cup seal can be more reliably held and, therefore, can be more reliably prevented from moving in the axial direction.

At the time of feeding the hydraulic fluid into the hydraulic chamber, further, both the base portion and the outer lip portion of the cup seal resiliently deflect and, besides, the projection of the inner lip portion comes in contact with the side wall of the recessed portion, forming a gap between the tip portion of the inner lip portion and the side wall of the recessed portion and, therefore, forming a hydraulic fluid passage of a large flow passage area. This makes it possible to feed a large amount of hydraulic fluid into the hydraulic chamber at the time of feeding the hydraulic fluid and, hence, to improve the fluid feed performance.

Further, since the cup seal makes it possible to feed a large amount of hydraulic fluid into the hydraulic chamber, the piston can be smoothly and quickly retracted at the time of releasing the operation. Therefore, the response can be improved when the piston retracts.

According to the master cylinder of the present invention as described above, the response can be improved at the time of commencing the operation, maintaining performance for sealing the hydraulic pressure in the cup seal and pumping performance for feeding the hydraulic fluid.

According to the present invention, further, the seal member has a base portion that comes in contact with the base portion-side wall of the recessed portion in the inner peripheral surface of the cylinder hole of the cylinder body and at least one lip portion with an interference that comes in contact with the lip portion-side wall of the recessed portion in the inner peripheral surface of the cylinder hole of the cylinder body at all times. Therefore, the seal member is prevented from moving at the time of the piston stroke, thereby enabling the instability of operation and loss of force to be decreased.

Further, the lip portion-side wall of the recessed portion in the inner peripheral surface of the cylinder hole of the cylinder body has a tapered portion formed in a tapered shape. This enables the seal member to be easily inserted, contributing to improving the assembling and improving the fluid feeding.

Further, the tapered portion has a gap between the base portion-side wall and the lip portion-side wall that becomes narrow toward the bottom wall of the recessed portion, facilitating easy insertion.

Further, the seal member is a cup seal of nearly an E-shape in cross section, and the cup seal of the E-shape is provided with an intermediate lip portion having an interference that comes in contact with the lip portion-side wall. Therefore, the contact is attained nearly at the intermediate portion of the lip portion-side wall of the recessed portion, enabling the seal member to become more stable than coming in contact at the end portion.

Further, the interference of the intermediate lip portion is partly arranged in the circumferential direction, improving the flow of the fluid.

BRIEF DESCRIPTION OF THE DRAWINGS

FIGS. 2(a) and (b) are partly enlarged sectional views of a portion of the cup seal in the master cylinder in an example shown in FIG. 1.

FIG. 9 is a view illustrating a fourth embodiment.

BEST MODE FOR CARRYING OUT THE INVENTION

Described below with reference to the drawings is the best mode for carrying out the present invention.

Figure 1:
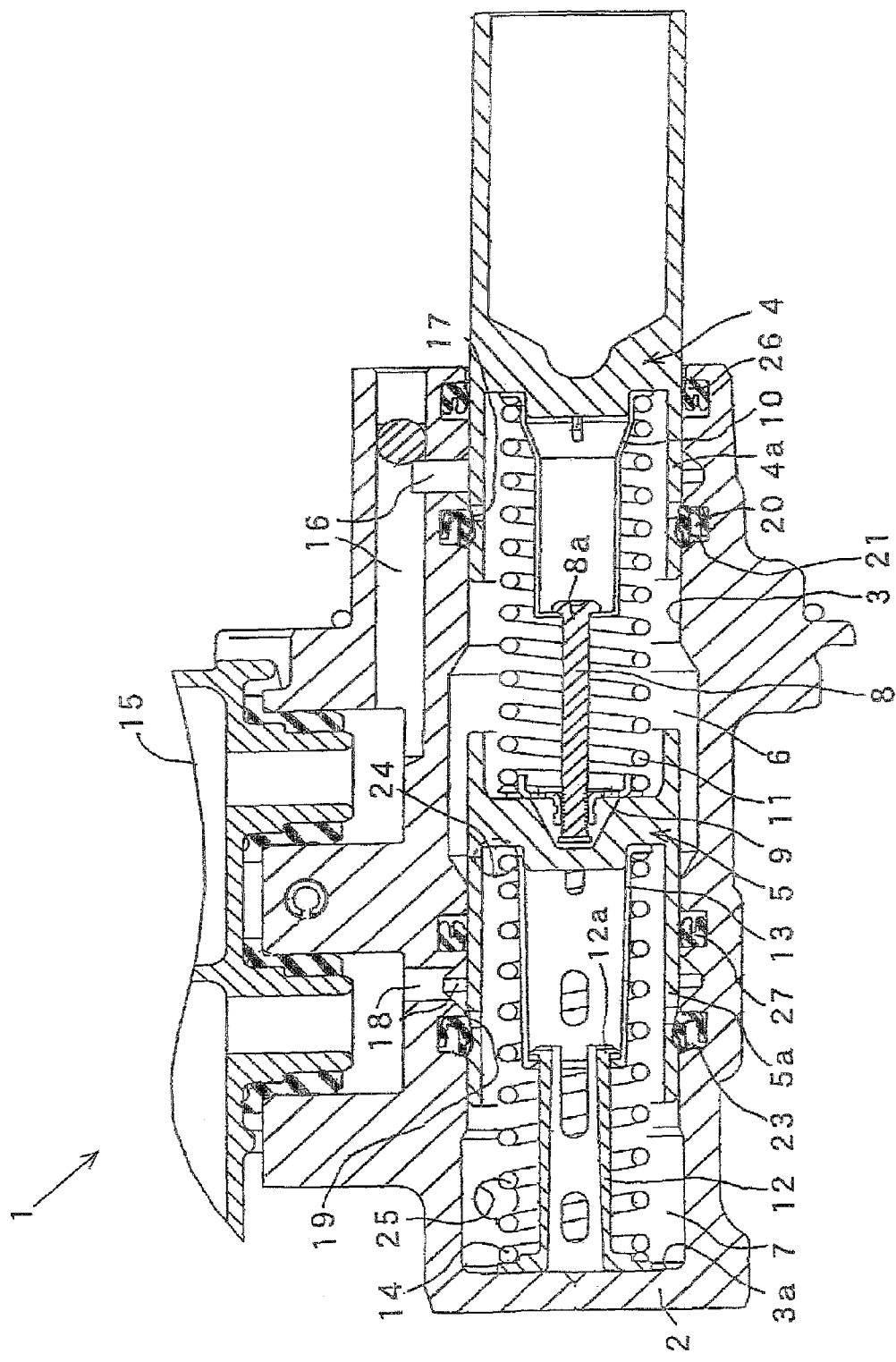
FIG. 1 is a vertical sectional view illustrating a first embodiment of a master cylinder equipped with a cup seal according to the present invention.

[FIG. 1] is a vertical sectional view illustrating an embodiment of a master cylinder equipped with a cup seal (seal member) according to the present invention, and [FIGS. 2] (a) and (b) are partly enlarged sectional views of a portion of a first cup seal portion in FIG. 1. In the following description related to the master cylinder, the front and back are the left and right in the drawings, respectively.

Referring to FIG. 1, a plunger type master cylinder 1 is used as the master cylinder of a brake system and includes a cylinder body 2. A cylinder hole 3 is formed in the cylinder body 2.

A primary piston 4 and a secondary piston 5 are inserted in the cylinder hole 3 so as to slide therein. The primary piston 4 is moved leftward by a brake pedal or by a brake booster that multiplies the depressing force of the brake pedal and outputs it (not shown). Being divided by the primary piston 4 and the secondary piston 5, the cylinder hole 3 forms therein a first hydraulic chamber 6 between the primary piston 4 and the secondary piston 5, and a second hydraulic chamber 7 between the secondary piston 5 and the bottom portion 3a of the cylinder hole 3.

The primary piston 4 has, on the front side thereof, a cylindrical portion 4a of the front end side as shown in FIG. 1, and a circular recessed portion 4b (corresponds to a recessed portion on the piston side of the present invention) of the shape of a triangular shape in cross section in the radial direction formed in the outer peripheral surface of the cylindrical portion 4a of the front end side and comprising a front side tapered surface $4b_1$ and a rear side tapered surface $4b_2$ as shown in FIGS. 2(a) and (b). As shown in FIG. 1, further, the secondary piston 5, too, has, on the front side thereof, a cylindrical portion 5a of the front end side as well as a circular recessed portion of a triangular shape in cross section in the radial direction formed in the outer peripheral surface of the cylindrical portion 5a of the front end side and being the same as the recessed portion 4b of the primary piston 4.

A first shaft member 8 is arranged in the first hydraulic chamber 6 and is provided with a pair of right and left first and second retainers 9 and 10. The first retainer 9 is fixed to the first shaft member 8 while the second retainer 10 can slide relative to the first shaft member 8. Here, when the second retainer 10 comes in contact with a flange 8a formed at the right end of the first shaft member 8, the first and second retainers 9 and 10 are set in a state where they are spaced apart from each other to a maximum degree shown in FIG. 1. A first return spring 11 is provided being compressed between the first and second retainers 9 and 10. The first retainer 9 is in contact with the secondary piston 5 at all times while the second retainer 10 is in contact with the primary piston 4 at all times. When the master cylinder 1 shown in FIG. 1 is not in operation, the primary piston 4 and the secondary piston 5 are set in a state where they are spaced apart to a maximum degree.

Further, a second shaft member 12 is arranged in the second hydraulic chamber 7, and a third retainer 13 is fitted to the second shaft member 12 so as to slide. Here, the inner peripheral flange at the left end of the third retainer 13 comes in contact with a flange 12a formed at the right end of the second shaft member 12, and the second shaft member 12 and the third retainer 13 are set in a state where they are stretched to a maximum degree shown in FIG. 1. A second return spring 14 is provided being compressed between the flange 12b formed at the left end of the second shaft member 12 and the third retainer 13. The third retainer 13 is in contact with the secondary piston 5 at all times while the second shaft member 12 is in contact with the bottom portion 3a of the cylinder hole 3 at all times. When the master cylinder 1 shown in FIG. 1 is not in operation, the secondary piston 5 is set in a state where it is spaced apart from the bottom portion 3a to a maximum degree.

The cylinder body 2 is provided with a reservoir 15 for storing a brake fluid which is the hydraulic fluid. The reservoir 15 can be connected to the first hydraulic chamber 6 through a first connecting passage 16 connected to the reservoir 15, an axial passage 22 connected to the first connecting passage 16 and a first relief port 17 formed in the primary piston 4 and connected to the first hydraulic chamber 6 at all times. The first relief port 17 is constituted by a connecting hole in the radial direction that is so perforated as to be positioned in the rear tapered surface $4b_2$ of the recessed portion 4b in the front end-side cylindrical portion 4a of the primary piston 4, and that connects the first hydraulic chamber 6 on the inner peripheral side of the primary piston 4 to the axial passage 22 on the outer peripheral side of the primary piston 4. The axial passage 22 is connected at all times to the right surface of a base portion 21a of a first cup seal 21.

The reservoir 15 can be, further, connected to the second hydraulic chamber 7 through a second connecting passage 18, an axial passage similar to the axial passage 22, and a second relief port 19 formed in the secondary piston 5. Like the first relief port 17, the second relief port 19, too, is constituted by a connecting hole perforated in the cylindrical portion 5a of the secondary piston 5 and connecting the second hydraulic chamber 7 on the inner peripheral side of the secondary piston 5 to the second connecting passage 18 on the outer peripheral side. The axial passage similar to the axial passage 22 is connected at all times to the right surface of a base portion of a second cup seal 23.

A recessed portion 20 of nearly a rectangular shape in cross section in the radial direction (corresponds to a recessed portion on the cylinder side of the invention) is formed in the inner peripheral surface of the cylinder hole 3 in which the primary piston 4 is arranged. The recessed portion 20 is constituted by a bottom portion 20a, a first side wall 20b erected from the rear end of the bottom portion 20a and a second side wall 20c erected from the front end of the bottom portion 20a. In this case, the open end portion of the second side wall 20c on the front side is forming a tapered surface 20c' expanding toward the open end. Referring to FIG. 1, the circular first cup seal 21 is held in the recessed portion 20, and the primary piston 4 is penetrating through the first cup seal 21 so as to slide while maintaining liquid-tightness. In a state where the first cup seal 21 is held in the recessed portion 20, a tip portion $21b_3$ of an inner lip portion 21b faces the second side wall 20c that includes the tapered surface 20c'.

Figure 3:
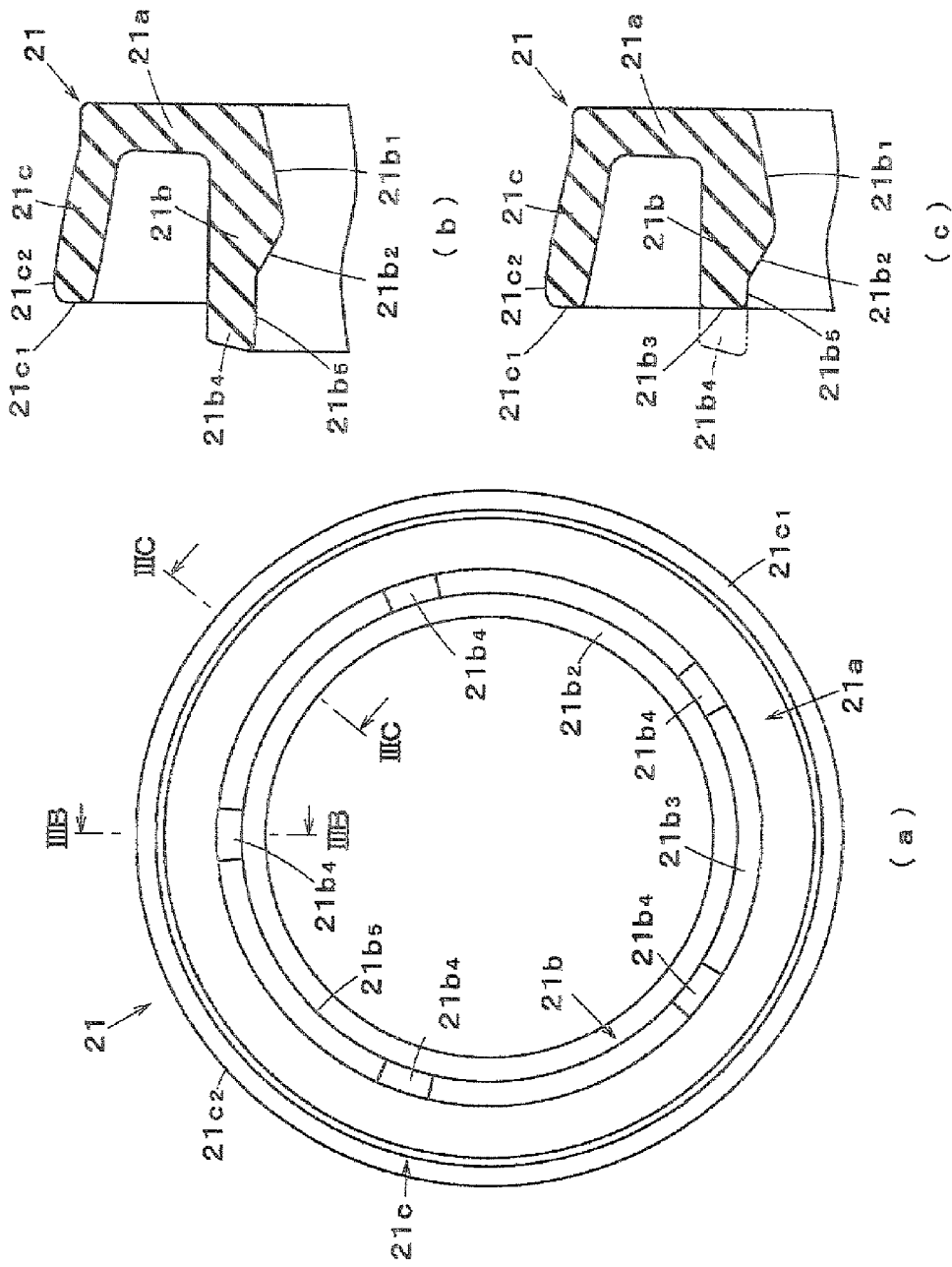
FIG. 3(a) is a front view of a first cup seal used for the master cylinder in an example shown in FIG. 1, (b) is a sectional view along the line IIIB-IIIB in (a), and (c) is a sectional view along the line IIIC-IIIC in (a).

As shown in FIGS. 3(a) to (c), the annular first cup seal 21 includes the annular base portion 21a which extends in the radial direction and through which the primary piston 4 penetrates so as to slide, the annular inner lip portion 21b which extends forward in the axial direction from the end on the inner peripheral side of the base portion 21a and through which the primary piston 4 penetrates so as to slide, and the annular outer lip portion 21c which extends forward in the axial direction from the end on the outer peripheral side of the base portion 21a and comes into detachable contact with the bottom wall 20a of the recessed portion 20. Therefore, the first cup seal 21 has a U-shape portion in cross section in the radial direction formed in a circular shape.

The inner lip portion 21b has an inner peripheral surface comprising a first tapered inner peripheral surface $21b_1$ which extends so that the inner diameter thereof gradually decreases forward in the axial direction from the end on the inner periphery of the base portion 21a, a second tapered inner peripheral surface $21b_2$ which so extends that the inner diameter thereof gradually increases forward in the axial direction from the first tapered inner peripheral surface $21b_1$, and an inner peripheral surface $21b_5$ which extends forward in the axial direction, while maintaining a constant diameter, from the second tapered inner peripheral surface $21b_2$. In the case, in the first cup seal 21 of this embodiment, the diameter of a portion of the inner lip portion 21b forming the first tapered inner peripheral surface $21b_1$ as a whole gradually decreases forward in the axial direction, and the diameter of a portion of the inner lip portion 21b forming the second tapered inner peripheral surface $21b_2$ as a whole gradually increases forward in the axial direction. In the cup seal of the present invention, however, at least the inner peripheral surface of the inner lip portion 21b should be formed as described above. The angle of inclination of the first tapered inner peripheral surface $21b_1$ is set to be equal to the angle of inclination of the rear tapered surface $4b_2$ of the annular recessed portion 4b that has a triangular shape in cross section in the radial direction in the outer peripheral surface of the primary piston 4 (these angles of inclination may be differed from each other as a matter of course).

On the tip portion $21b_3$ of the inner lip portion 21b, further, there are provided a predetermined number of positioning projections $21b_4$ (five in the illustrated embodiment; the number is arbitrary) maintaining an equal distance in the circumferential direction and protruding forward in the axial direction. The ends of the projections $21b_4$ are forming inclined surfaces being inclined relative to the axial direction of the first cup seal 21. The angle of inclination of the inclined surfaces at the ends of the projections $21b_4$ is set to be equal to the angle of inclination of the tapered surface 20c' of the recessed portion 20 (these angles of inclination may be differed from each other as a matter of course).

The outer lip portion 21c has a thickness smaller than that of the inner lip portion 21b, and extends so that the outer diameter gradually increases forward in the axial direction from the end of outer periphery of the base portion 21a. Further, the outer lip portion 21c resiliently and easily deflects to easily suck the brake fluid from the reservoir 15. Further, the outer lip portion 21c has a length in the axial direction nearly equal to the length of the inner lip portion 21b. Here, the length of the inner lip portion 21b may be set to be different from the length of the outer lip portion 21c in the axial direction. In this case, either the inner lip portion 21b or the outer lip portion 21c may be arbitrarily set to be longer than the other in the axial direction.

Referring to FIGS. 2(a) and (b), when the master cylinder 1 is not in operation in a state where the first cup seal 21 is held in the recessed portion 20, the end of projection $21b_4$ of the inner lip portion 21b is in surface contact with the tapered surface $20c'$ of the recessed portion 20. Further, the rear surface of the base portion $20a$ is in surface contact with the first side wall $20b$ of the recessed portion 20. Therefore, the first cup seal 21 does not move in the axial direction in the recessed portion 20 and is positioned in the axial direction. Referring to FIG. 2(b), further, the end $21b_3$ of the inner lip portion $21b$ is separated away from the tapered surface $20c'$ of the recessed portion 20. Therefore, the inner peripheral side and the outer peripheral side of the inner lip portion $21b$ are connected at all times through a gap between the end $21b_3$ of the inner lip portion $21b$ and the tapered surface $20c'$ of the recessed portion 20, permitting the brake fluid to flow therethrough.

When the primary piston 4 is not in operation, the first tapered inner peripheral surface $21b_1$ of inner lip portion $21b$ of the first cup seal 21 is in contact with the rear tapered surface $4b_2$ of the recessed portion $4b$ of the primary piston 4. Here, the rear tapered surface $4b_2$ of the primary piston 4 slightly pushes the first tapered inner peripheral surface $21b_1$ of the first cup seal 21 forward in the axial direction. Therefore, the first cup seal 21 is held in the axial direction due to the axial force of the primary piston 4. Further, the first relief port 17 has its rear edge positioned at the back of the rear surface of the first cup seal 21, and is connected to the first connecting passage 16 that is connected to the reservoir 15.

On the other hand, the tip portion $21c_1$ of the outer lip portion $21c$ faces the second side wall $20c$ on the front side of the recessed portion 20. A seal portion $21c_2$ is formed on the outer peripheral surface of the tip portion of the outer lip portion $21c$. When a hydraulic pressure generates in the first hydraulic chamber 6, the seal portion $21c_2$ comes into contact with the bottom wall $20a$ of the recessed portion 20 to attain sealing relative to the bottom wall $20a$. When the master cylinder 1 is not in operation in a state where the first cup seal 21 is held in the recessed portion 20 as shown in FIGS. 2(a) and (b), the seal portion $21c_1$ comes into contact with the bottom surface $20a$ of the recessed portion 20.

A recessed portion (no reference numeral is attached) which is the same as the above recessed portion 20 is also formed in the inner peripheral surface of the cylinder hole 3 in which the secondary piston 5 is arranged. An annular second cup seal 23 is held in the recessed portion, and the secondary piston 5 penetrates through the second cup seal 23 so as to slide maintaining liquid-tightness. The second cup seal 23 is formed in quite the same manner as the first cup seal 21. Therefore, its detailed description is not repeated here again.

When the secondary piston 5 is not in operation, the first tapered inner peripheral surface of the inner lip portion of the second cup seal 23 is in contact with the rear tapered surface of the recessed portion of the secondary piston 5 which is the same as the recessed portion $4b$ of the primary piston 4. Here, the rear tapered surface of the secondary piston 5 slightly pushes the first tapered inner peripheral surface of the second cup seal 23 forward in the axial direction. Therefore, the second cup seal 23 is held in the axial direction by the axial force of the secondary piston 5. Further, the second relief port 19 has its rear edge positioned at the back of the rear surface of the second cup seal 23, and is connected to the second connecting passage 18 that is connected to the reservoir 15.

Further, though not clearly shown in FIG. 1, an axial passage which is quite the same as the axial passage 22 is formed near the back of the second cup seal 23 to connect the second connecting passage 18 to the second relief port 19. The axial passage, is also connected at all times to the right surface of the base portion of the second cup seal 23 (the same as the right surface of the base portion $21a$ of the first cup seal 21).

The first hydraulic chamber 6 is connected to the first output port 24 as well as to wheel cylinders of the wheels of the one brake system of the two brake systems that are not shown through the first output port 24. Further, the second hydraulic chamber 7 is connected to the second output port 25 as well as to wheel cylinders of the wheels of the other brake system of the two brake systems that are not shown through the second output port 25.

A cup seal 26 is provided in the inner periphery at the rear end of the cylinder hole 3 of the cylinder body 2, and the primary piston 4 is penetrating through the cup seal 26 so as to slide. The cup seal 26 is a conventional cup seal different from the above first and second cup seals 21 and 23, and maintains liquid-tightness between the inner peripheral surface of the cylinder hole 3 of the cylinder body 2 and the outer peripheral surface of the primary piston 4. This prevents the brake fluid in the first connecting passage 16 from leaking to the exterior from the cylinder body 2.

Similarly, a cup seal 27 is provided near the back of the second connecting passage 18 in the cylinder hole 3 of the cylinder body 2, and the secondary piston 5 is penetrating through the cup seal 27 so as to slide. The cup seal 27, too, is a conventional cup seal different from the above first and second cup seals 21 and 23, and maintains liquid-tightness between the inner peripheral surface of the cylinder hole 3 of the cylinder body 2 and the outer peripheral surface of the primary piston 4. This maintains the hydraulic pressure in the first hydraulic chamber 6.

Next, described below is the operation of the thus constituted master cylinder 1 of this embodiment.

In a state where the brake is not in operation shown in FIG. 1 and FIGS. 2(a) and (b), the primary piston 4 and the secondary piston 5 are both set to the inoperative positions that are shown. The inoperative positions are the limit retracted positions of the two pistons 4 and 5. When the primary piston 4 is at its limit retracted position, the rear end of the first relief port 17 is partly positioned behind the rear end of the base portion $21a$ of the first cup seal 21 to form a predetermined gap α (shown in FIG. 1(b)). Due to the gap α, the first relief port 17 is connected to the first connecting passage 16 through the axial passage 22. Therefore, the first hydraulic chamber 6 is connected to the reservoir 15, and the interior of the first hydraulic chamber 6 is assuming the atmospheric pressure generating no hydraulic pressure. When the secondary piston 5 is at its limit retracted position, similarly, the second hydraulic chamber 7 is connected to the reservoir 15, and the interior of the second hydraulic chamber 7 assumes the atmospheric pressure generating no hydraulic pressure.

When the brake pedal is depressed to move the primary piston 4 forward, the rear tapered surface $4b_2$ of the primary piston 4 pushes the first tapered inner peripheral surface $21b_1$ of the first cup seal 21 forward in the axial direction with a large axial force. Here, the projection $21b_4$ of the first cup seal 21 is in contact with the tapered surface $20c'$ of the recessed portion 20, and the first cup seal 21 is reliably held in the axial direction by the axial force of the primary piston 4. Accordingly, the first cup seal 21 does not move forward in the axial direction. In particular, since the projection $21b_4$ of the first cup seal 21 is in contact with the tapered surface $20c'$ of the recessed portion 20, a further increased axial force is exerted on the first cup seal 21 from the primary piston 4, and the first cup seal 21 is held further reliably.

The first relief port 17 as a whole is closed by the base portion $21a$ and the inner lip portion $21b$ of the first cup seal 21. Here, the first cup seal 21 does not move forward in the axial direction and suppresses the ineffective stroke of the primary piston 4. Namely, the effective stroke of the brake pedal is suppressed. If the first relief port 17 as a whole is closed by the first cup seal 21, the first relief port 17 and the first connecting passage 16 are shut off from each other, the first hydraulic chamber 6 is shut off from the reservoir 15, and a hydraulic pressure generates in the first hydraulic chamber 6 depending upon the force with which the pedal is depressed.

Further, the secondary piston 5 moves forward due to the pedal-depressing force that is produced by the primary piston 4 moving forward and is transmitted through the first return spring 11. Therefore, the rear tapered surface of the secondary piston 5 pushes the first tapered inner peripheral surface of the second cup seal 23 forward in the axial direction with a large axial force. Here, the projection of the second cup seal 23 is in contact with the tapered surface of the recessed portion, and the second cup seal 23 is reliably held in the axial direction by the axial force of the secondary piston 5. Therefore, the second cup seal 23 does not move forward in the axial direction, and the ineffective stroke of the secondary piston 5 is suppressed. Similarly, the second hydraulic chamber 7 is shut off from the reservoir 15, and a hydraulic pressure generates in the second hydraulic chamber 7.

The hydraulic pressure in the first hydraulic chamber 6 pushes the first cup seal 21 rearward in the recessed portion 20, and the rear end surface of the base portion 21a closely contacts to the first side wall 20b of the recessed portion 20. The base portion 21a attains the sealing relative to the first side wall 20b of the recessed portion 20. Further, the inner peripheral surface of the inner lip portion 21b of the first cup seal 21 closely contacts to the outer peripheral surface of the primary piston 4, and the seal portion $21c_2$ of the outer lip portion 21c of the first cup seal 21 closely contacts to the bottom wall 20a of the recessed portion 20. The seal portion $21c_2$ attains the sealing relative to the bottom wall 20a of the recessed portion 20. That is, the base portion 21a and the seal portion $21c_1$ constitute a double-seal portion being arranged in series relative to the flow of the brake fluid from the first hydraulic chamber 6 to the reservoir 15 through between the outer peripheral surface of the outer lip portion 21c and the bottom wall 20a of the recessed portion 20 and between the rear end surface of the base portion 21a and the first side wall 20b of the recessed portion 20.

Therefore, the first hydraulic chamber 6 is sealed from the reservoir 15, the brake fluid in the first hydraulic chamber 6 does not leak into the reservoir 15, and the hydraulic pressure is maintained in the hydraulic chamber 6. Here, it is presumed that the sealing surface pressure of the seal portion $21c_2$ is partly small, and the brake fluid in the first hydraulic chamber 6 leaks through a portion having a small sealing surface pressure in the seal portion between the seal portion $21c_2$ and the bottom wall 20a of the recessed portion 20. However, the brake fluid leaking through the seal portion $21c_2$ is shut off by the seal portion between the base portion 21a and the first side wall 20b of the recessed portion 20, and does not leak into the axial passage 22.

As described above, due to the double seal by the seal portion $21c_2$ and the base portion 21a arranged in series in the direction in which the brake fluid flows, the brake fluid in the first hydraulic chamber 6 is reliably prevented from leaking, and the hydraulic pressure is maintained in the first hydraulic chamber 6 to a high degree.

As the primary piston 4 further moves forward, the hydraulic pressure increases in the first hydraulic chamber 6. The hydraulic pressure in the first hydraulic chamber 6 is fed from the first output port 24 into the wheel cylinders of the one brake system, and the brakes of the one brake system operate.

As the secondary piston 5 moves forward, on the other hand, a hydraulic pressure generates in the second hydraulic chamber 7. Similarly, the brake fluid in the second hydraulic chamber 7 is reliably prevented from leaking due to the double sealing by the base portion and the seal portion of the second cup seal 23, and the hydraulic pressure is maintained in the second hydraulic chamber 7 to a high degree.

As the secondary piston 5 further moves forward, the hydraulic pressure increases in the second hydraulic chamber 7. The hydraulic pressure in the second hydraulic chamber 7 is fed from the second output port 25 into the wheel cylinders of the other brake system, and the brakes of the other brake system operate.

If the brake pedal is no longer depressed in the state where the brake is in operation, the primary piston 4 retracts due to the resilient force of the first return spring 11 and tends to return to the inoperative position. Therefore, the hydraulic pressure in the first hydraulic chamber 6 drops and tends to assume a negative pressure instantaneously. Since the rear end side of the outer lip portion 21c is connected to the reservoir 15 and assumes the atmospheric pressure, the base portion 21a of the first cup seal 21 is pushed and is resiliently deflected forward to form a gap between the rear end surface of the base portion 21a of the first cup seal 21 and the first side wall 20b of the recessed portion 20. Further, since the hydraulic pressure in the first hydraulic chamber 6 tends to assume a negative pressure instantaneously, the front end side of the outer lip portion 21c deflects inward to form a gap between the bottom wall 20a of the recessed portion 20 and the seal portion $21c_2$ of the outer lip portion 21c.

Therefore, the brake fluid in the reservoir 15 flows to the front side of the first cup seal 21 through the first connecting passage 16, axial passage 22, gap between the rear end surface of the base portion 21a and the first side wall 20b of the recessed portion 20, and gap between the bottom wall 20a and the outer lip portion 21c.

The brake fluid that flows into the front side of the first cup seal 21, further, flows into the first hydraulic chamber 6. With the first cup seal 21 of this embodiment in this case, the projection $21b_4$ provided at the tip portion $21b_3$ of the inner lip 21b comes in contact with the tapered surface 20c' of the second side wall 20c of the recessed portion 20 so that the first cup seal 21 is positioned. Here, however, a portion of the tip portion $21b_3$ of the inner lip 21b without the projection $21b_4$ is separated away from the tapered surface 20c', and a gap is formed therebetween. Therefore, a large amount of brake fluid on the front side of the first cup seal 21 smoothly flows into the first hydraulic chamber 6 through the gap.

Accordingly, the brake fluid is reliably fed from the reservoir 15 to the first hydraulic chamber 6, the primary piston 4 smoothly and quickly retracts being urged by the first return spring 11, and the hydraulic pressure decreases in the first hydraulic chamber 6.

Accompanying the retraction of the primary piston 4 and the decrease of hydraulic pressure in the first hydraulic chamber 6, the secondary piston 5 commences to retract being urged by the second return spring 14. At this moment, a large amount of brake fluid is fed from the reservoir 15 into the second hydraulic chamber 7 like into the above first hydraulic chamber 6. Therefore, the secondary piston 5, too, smoothly and quickly retracts and the hydraulic pressure decreases in the second hydraulic chamber 7.

As the primary piston 4 retracts and as the rear end of the first relief port 17 is partly positioned at the back of the rear end of the base portion 21a of the first cup seal 21 as shown in FIG. 1 and FIGS. 2(a) and (b), the first relief port 17 is connected to the first connecting passage 16 through the axial passage 22. Therefore, the brake fluid in the first hydraulic chamber 6 is drained into the reservoir 15 through the first relief port 17 and the first connecting passage 16, and the hydraulic pressure further decreases in the first hydraulic chamber 6.

Similarly, as the secondary piston 5 retracts, the second relief port 19 is connected to the second connecting passage 18, the brake fluid in the second hydraulic chamber 7 is drained into the reservoir 15 through the second relief port 19 and the second connecting passage 18, and the hydraulic pressure further decreases in the second hydraulic chamber 7.

After brought to their limit retracted positions shown in FIG. 1, the two pistons 4 and 5 come into a halt, the first and second hydraulic chambers 6 and 7 assume the atmospheric pressure, the master cylinder 1 becomes inoperative, and the brake is released.

According to the first cup seal 21 of this embodiment as described above, the projection $21b_4$ provided at the tip portion of the inner lip portion 21b comes into contact with the second side wall 20c of the recessed portion 20, and a large axial force is exerted in the axial direction on the first tapered inner peripheral surface $21b_1$ of the first cup seal 21 from the rear tapered surface $4b_2$ of the primary piston 4. Therefore, the first cup seal 21 can be reliably held in the axial direction by the axial force. Accordingly, the first cup seal 21 can be suppressed from moving in the axial direction. In particular, the projection $21b_4$ of the first cup seal 21 comes into contact with the tapered surface 20c' of the second side wall 20c, making it possible to obtain a larger axial force and, therefore, to more reliably hold the first cup seal 21. The same effect as that of the first cup seal 21 can be also obtained owing to the second cup seal 23 of this embodiment.

At the time of feeding the hydraulic fluid into the first and second hydraulic chambers 6 and 7, further, both the base portions and the outer lip portions of the first and second seals 21 and 23 undergo resilient deflection and, besides, the projections of the inner lips come in contact with the second side walls, forming gaps between the tip portions of the inner lip portions and the second side walls of the recessed portions and, therefore, forming hydraulic fluid passages of large flow passage areas. At the time of feeding the hydraulic fluid, therefore, the hydraulic fluid can be fed in large amounts into the hydraulic chambers and, therefore, the fluid feed performance can be improved.

According to the first and second cup seals 21 and 23, further, when a hydraulic pressure is generated on the inner lip side in relation to the base portion, the outer lip portion closely contacts to the bottom wall of the recessed portion and the base portion closely contacts to the side wall of the recessed portion to prevent the leakage of hydraulic pressure. Further, at the time of feeding the hydraulic fluid, the outer lip portion separates away from the bottom wall of the recessed portion, and the base portion separates away from the side wall of the recessed portion permitting the hydraulic pressure to be fed. Thus, the cup seal of the present invention can be prevented from moving in the axial direction yet maintaining the sealing performance for sealing the hydraulic pressure and the pumping performance for feeding the hydraulic fluid.

According to the master cylinder 1 using the first and second cup seals 21 and 23 of this embodiment, on the other hand, the first and second cup seals 21 and 23 are prevented from moving forward in the axial direction at the time when the primary piston 4 and the secondary piston 5 start moving (operating) forward, suppressing ineffective strokes of the primary piston 4 and of the secondary piston 5. At the time when the primary piston 4 and the secondary piston 5 move forward, therefore, the brake fluid pressure can be quickly generated in an increased amount in the first and second hydraulic chambers 6 and 7.

According to the master cylinder of this embodiment, further, at the time of feeding the brake fluid into the first hydraulic chamber 6, both the base portion 21a and the outer lip portion 21c of the first cup seal 21 undergo resilient deflection and, besides, the projection $21b_4$ of the inner lip portion 21b comes in contact with the tapered surface 20c of the second side wall 20c of the recessed portion 20, forming gaps between the tip portion $21b_3$ of the inner lip portion 21b and the second side wall 20c of the recessed portion 20 and, therefore, forming a brake fluid passage of a large flow passage area. At the time of feeding the brake fluid, therefore, the brake fluid can be fed in large amounts into the first hydraulic chamber 6 and, therefore, the fluid feed performance can be improved.

At the time of feeding the brake fluid into the second hydraulic chamber 7, the same also holds as that of when the brake fluid is fed into the above first hydraulic chamber 6.

Further, since the first and second cup seals 21 and 23 enable the brake fluid to be fed in large amounts into the first and second hydraulic chambers 6 and 7, the primary piston 4 and the secondary piton 5 can be smoothly and quickly retracted when the operation is released. Therefore, the response can be improved at the time when the primary piston 4 and the secondary piston 5 retract.

As described above, the master cylinder of this embodiment makes it possible to improve the response at the start of operation yet maintaining the sealing performance for sealing the hydraulic pressure and the pumping performance for feeding the hydraulic fluid.

Not being limited to the master cylinder of the brake device of the above embodiment only, the cup seal of the present invention can be used for any cylinder device which comprises a cylinder and a slide member arranged in the cylinder so as to move relative thereto in the axial direction, and in which the cup seal blocks the flow of the hydraulic fluid from the one side in the axial direction to the other side in the axial direction and in which the cup seal permits the flow of the hydraulic fluid from the other side in the axial direction to the one side in the axial direction.

Further, not being limited to the master cylinder of the brake device of the above embodiment only, the master cylinder of the present invention can be used as a master cylinder of the clutch device as well as for any hydraulic device which generates the hydraulic pressure in the hydraulic chamber as the piston moves forward. The above embodiment describes a tandem master cylinder in which two pistons are arranged in series. However, the master cylinder of the present invention can be applied to a single master cylinder as well as to any master cylinder provided it is a master cylinder of the plunger type.

Next, another embodiment of the present invention will be described.

Figure 4:
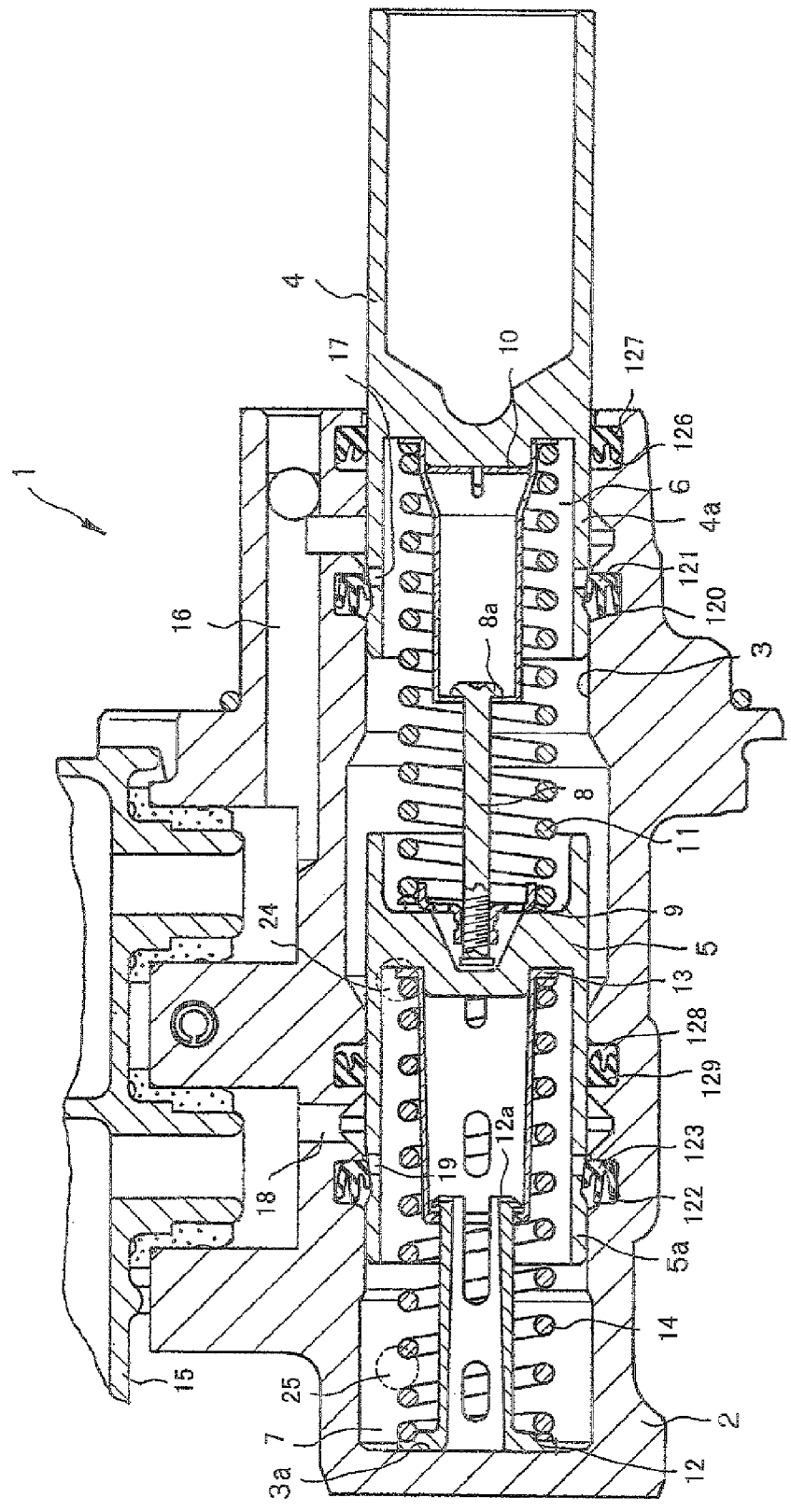
FIG. 4 is a view illustrating a second embodiment of the master cylinder.

FIG. 4 illustrates a second embodiment of the master cylinder according to the present invention. Referring to FIG. 4, a plunger type master cylinder 1 is provided with a cylinder body 2 which has a cylinder hole 3 formed therein.

A primary piston 4 which is an example of a piston of the present invention and a secondary piston 5 which is an example of a piston of the present invention are inserted in the cylinder hole 3 so as to slide therein. The primary piston 4 is moved leftward by a brake pedal or by a brake booster that multiplies the depressing force of the brake pedal and outputs it (not shown). Being divided by the primary piston 4 and the secondary piston 5, the cylinder hole 3 forms therein a first hydraulic chamber 6 between the primary piston 4 and the secondary piston 5, and a second hydraulic chamber 7 between the secondary piston 5 and the bottom portion 3a of the cylinder hole 3.

A first shaft member 8 is arranged in the first hydraulic chamber 6 and is provided with a pair of right and left first and second retainers 9 and 10. The first retainer 9 is fixed to the first shaft member 8 while the second retainer 10 slides relative to the first shaft member 8. Here, when the second retainer 10 comes in contact with a latch portion 8a formed at the right end of the first shaft member 8, the first and second retainers 9 and 10 are set in a state where they are spaced apart to a maximum degree in FIG. 4. A first return spring 11 is provided being compressed between the first and second retainers 9 and 10. The second retainer 10 is in contact with the primary piston 4 at all times while the first retainer 9 is in contact with the secondary piston 5 at all times. When the master cylinder 1 shown in FIG. 4 is not in operation, the primary piston 4 and the secondary piston 5 are set in a state where they are spaced apart to a maximum degree.

Further, a pair of right and left third retainer (second shaft member) 12 and fourth retainer 13 are provided in the second hydraulic chamber 7. The fourth retainer 13 slides relative to the third retainer 12. In this case, the third and fourth retainers 12 and 13 are set in a state of being spaced apart from each other to a maximum degree in FIG. 4. A second return spring 14 is provided being compressed between the third and fourth retainers 12 and 13. The fourth retainer 13 is in contact with the secondary piston 5 at all times while the third retainer 12 is in contact with the bottom portion 3a of the cylinder hole 3 at all times. When the master cylinder 1 is not in operation, the secondary piston 5 is set in a state where it is spaced apart from the bottom portion 3a to a maximum degree.

The cylinder body 2 is provided with a reservoir 15. The reservoir 15 can be connected to the first hydraulic chamber 6 through a first connecting passage 16 and through a first relief port 17 that is formed in the primary piston 4 and is connected to the first hydraulic chamber 6 at all times. The first relief port 17 is constituted by a radial connecting hole that is perforated in the left end-side cylindrical portion 4a of the primary piston 4, and that connects first hydraulic chamber 6 on the inner peripheral side of the primary piston 4 to the first connecting passage 16 on the outer peripheral side. Further, the reservoir 15 can be connected to the second hydraulic chamber 7 through the second connecting passage 18 and the second relief port 19 formed in the secondary piston 5. Like the first relief port 17, the second relief port 19, too, is constituted by a radial connecting hole that is perforated in the cylindrical portion 5a of the secondary piston 5, and that connects the second hydraulic chamber 7 on the inner peripheral side of the secondary piston 5 to the second connecting passage 18 on the outer peripheral side.

Figure 5:
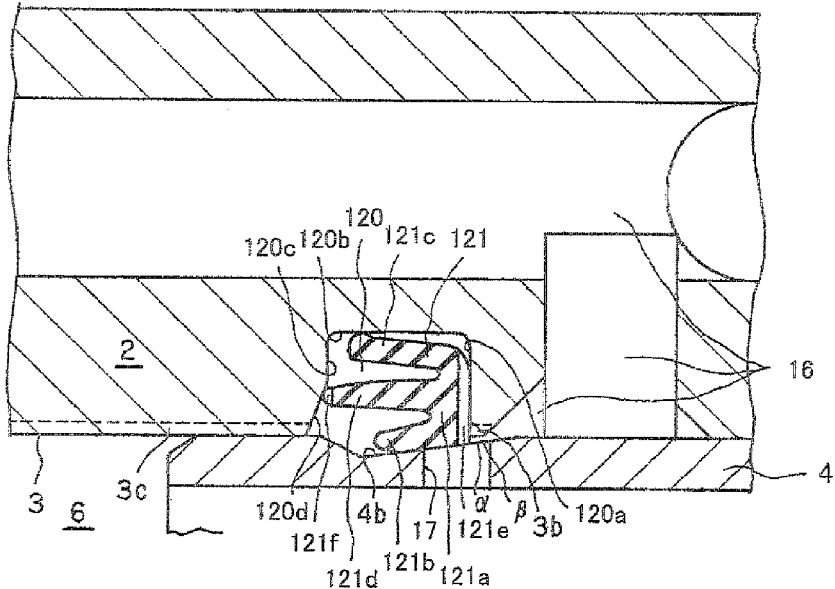
FIG. 5 is a sectional view of a first seal member on an enlarged scale.

FIG. 5 is a sectional view illustrating, on an enlarged scale, the periphery of a first seal member (first cup seal) 121. As shown in FIG. 5, the annular first seal member 121 is a cup seal of nearly an E-shape in cross section including a circular base portion 121a that extends in the radial direction, comes in contact with a base portion-side wall 120a of a first recessed portion 120 and through which the primary piston 4 penetrates so as to slide, an annular inner lip portion 121b which extends in the axial direction from the inner peripheral end of the base portion 121a and through which the primary piston 4 penetrates so as to slide, an annular outer lip portion 121c which extends in the axial direction from the outer peripheral end of the base portion 121a and comes into detachable contact with the bottom wall 120b of the first recessed portion 120, and an annular intermediate lip portion 121d which extends in the axial direction from the base portion 121a between the inner lip portion 121b and the outer lip portion 121c, and having an interference that always comes in contact with a lip portion-side wall 120c of the first recessed portion 120.

Here, the lip portion-side wall 120c of the first recessed portion 120 is provided with a tapered portion 120d in a manner that the gap between the base portion-side wall 120a and the lip portion-side wall 120c becomes narrower toward the bottom wall 120b to facilitate the insertion at the time of so assembling that the intermediate lip portion 121d of the first seal member 121 possesses an interference that comes in contact with the lip portion-side wall 120c of the first recessed portion 120 at all times. Here, the tapered portion 120d may be formed on part of the lip portion-side wall 120c, or the lip portion-side wall 120c may be all tapered to form a tapered portion 120d.

The base portion 121a is provided with a predetermined number of base portion-side grooves 121e opening rearward to connect the outer peripheral side of the base portion 121a to the inner peripheral side thereof, and the intermediate lip portion 121d is provided with a predetermined number of lip portion-side grooves 121f opening in the tip portion thereof to connect the outer peripheral side of the intermediate lip portion 121d to the inner peripheral side thereof. The intermediate lip portion 121d may not be of a complete annular shape but instead, the interference may be partly arranged in the circumferential direction permitting the fluid to flow through.

Further, an annular recessed portion 4b is formed in the outer peripheral surface of the primary piston 4 in which the first relief port 17 is opened. When not in operation, the annular recessed portion 4b forms a relatively large gap β relative to the inner peripheral surface of the cylinder body 2.

Further, a first axial groove 3b is formed in the inner peripheral surface of the cylinder hole 3 formed in the cylinder body 2 neighboring the base portion 121a of the first seal member 121, so that the base portion-side grooves 121e are connected to the reservoir 15 at all times. Further, a second axial groove 3c is formed in the inner peripheral surface of the cylinder hole 3 formed in the cylinder body 2 neighboring the lip portion-side grooves 121f in the intermediate lip portion 121d of the first seal member 121, so that the first recessed portion 120 in which the first seal member 121 is arranged is connected to the first hydraulic chamber 6 at all times. Instead of forming the axial grooves, i.e., instead of forming the first axial groove 3b and the second axial groove 3c in the inner peripheral surface of the cylinder body 2, it is also allowable to form a gap between the inner peripheral surface of the cylinder body 2 and the outer peripheral surface of the primary piston 4 to a degree that maintains the flow rate of the brake fluid without impairing the guide function of the primary piston 4.

Here, the lip portion-side grooves 121f and the base portion-side grooves 121e are both provided at positions where they face each other in the axial direction, and their widths (lengths in the circumferential direction) are set to be equal to each other. However, the numbers, positions and widths of the lip portion-side grooves 121f and the base portion-side grooves 121e may be differed, and may be independently and arbitrarily set. Here, the grooves 121f and 121e are used as the brake fluid flow passages when the two pistons 4 and 5 return after operation of master cylinder 1, and their widths must be set to at least such sizes that the grooves 121f and 121e are not crushed when the two pistons 4 and 5 return. This secures the flow of the brake fluid through the base portion-side grooves 121e, and the fluid feed performance of the first seal member 121 can be further improved.

Referring to FIG. 4, the first hydraulic chamber 6 is connected to a first output port 24 and is, further, connected to wheel cylinders of the wheels of the one brake system of the two brake systems (not shown) through the first output port 24. Further, the second hydraulic chamber 7 is connected to a second output port 25 and is, further, connected to wheel cylinders of the wheels of the other brake system of the two brake systems (not shown) through the second output port 25.

Further, a recessed portion 126 for first sealing is provided in the inner periphery of the cylinder hole 3 of the cylinder body 2 in which the primary piston 4 is arranged, and a first seal 127 is disposed in the recessed portion 126 for first sealing. The primary piston 4 penetrates through the first seal 127 so as to slide. Unlike the cup seal of the above first seal member 121, the cup seal of the first seal 127 comprises a conventionally known cup seal and maintains liquid-tightness between the inner peripheral surface of the cylinder hole 3 of the cylinder body 2 and the outer peripheral surface of the primary piston 4.

An annular second seal member (second cup seal) 123 is held in a second recessed portion 122 in the cylinder hole 3 in which the secondary piston 5 is arranged, a second seal 129 is disposed in the recessed portion 128 for second sealing, and the secondary piston 5 penetrates through the second seal member 123 and the second seal 129 so as to slide maintaining liquid-tightness. The second recessed portion 122, second seal member 123, recessed portion 128 for second sealing and the second seal 129 are constituted quite the same as the first recessed portion 120, first seal member 121, recessed portion 126 for first sealing and the first seal 127 shown in FIG. 5. Therefore, the second recessed portion 122, second seal member 123, recessed portion 128 for second sealing and the second seal 129 are not described here again in detail.

Figure 6:
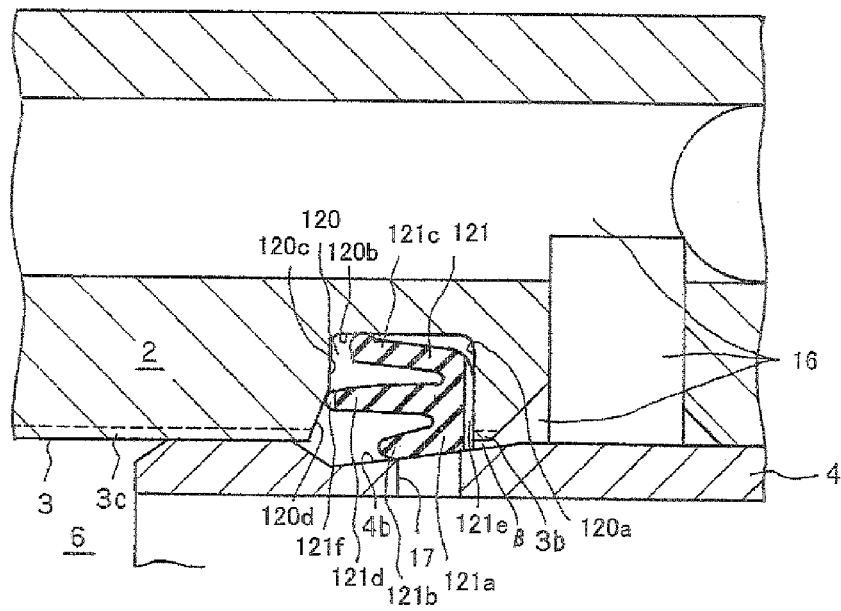
FIG. 6 is a sectional view of the first seal member on an enlarged scale.

In the master cylinder 1 in the inoperative state, if the brake pedal is depressed and the primary piston 4 moves forward, the first relief port 17 as a whole is closed by the base portion 121a and the inner lip portion 121b of the first seal member 121 as shown in FIG. 6. Accordingly, the first relief port 17 is shut off from the first connecting passage 16, the first hydraulic chamber 6 is shut off from the reservoir 15, and a hydraulic pressure generates depending upon the pedal depressing force. Further, the secondary piston 5 moves forward due to the above depressing force transmitted, via the first return spring 11, from the primary piston 4 that moves forward. Similarly, therefore, the second hydraulic chamber 7 is shut off from the reservoir 15, and a hydraulic pressure generates in the second hydraulic chamber 7.

Due to the hydraulic pressure in the first hydraulic chamber 6, therefore, the inner lip portion 121b of the first seal member 121 closely contacts to the outer peripheral surface of the primary piston 4, and the outer lip portion 121c of the first seal member 121 closely contacts to the bottom wall 120b of the first recessed portion 120 that holds the first seal member 121. Accordingly, the first hydraulic chamber 6 is sealed from the reservoir 15, and the hydraulic pressure in the first hydraulic chamber 6 does not leak into the reservoir 15. The hydraulic pressure in the first hydraulic chamber 6 increases as the primary piston 4 further moves forward. The hydraulic pressure in the first hydraulic chamber 6 is fed from the first output port 24 into the wheel cylinders of the one brake system, and the brakes of the one brake system operate.

Similarly, the second hydraulic chamber 7 is sealed from the reservoir 15 by the second seal member 123, and the hydraulic pressure in the second hydraulic chamber 7 does not leak into the reservoir 15. The hydraulic pressure in the second hydraulic chamber 7 increases as the secondary piston 5 further moves forward. The hydraulic pressure is fed from the second output port 25 into the wheel cylinders of the other brake system, and the brakes of the other brake system operate.

Here, in the conventional master cylinder, a gap exists between the lip portion-side wall of the recessed portion and the seal member and, therefore, the seal member moves being pulled by the piston that moves forward, causing the operation to lose stability. In the master cylinder 1 of this embodiment, however, the lip portion-side wall 120c of the first recessed portion 120 is in contact with the intermediate lip portion 121d of the first seal member 121, and the lip portion-side wall 122c that is not shown of the second recessed portion 122 is in contact with the intermediate lip portion 123d that is not shown of the second seal member 123. Therefore, the first seal member 121 and the second seal member 123 do not move, little establishing such a state that the operation loses stability.

Figure 7:
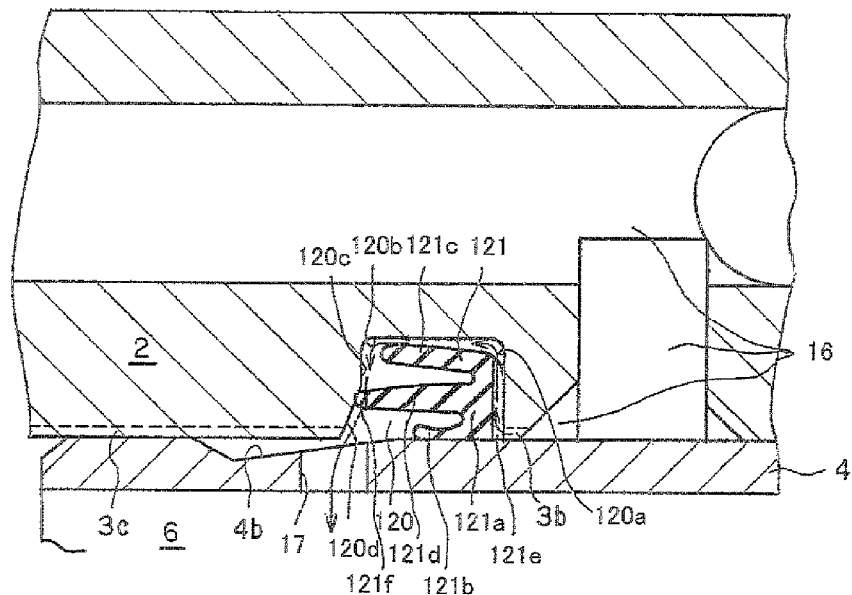
FIG. 7 is a sectional view of the first seal member on an enlarged scale.

After the operation of the master cylinder 1, when the primary piston 4 rapidly moves back to the inoperative state, the brake fluid flows from the reservoir 15 into the first recessed portion 120 on the left side of the outer lip portion 121c passing through the outer peripheral sides of the base portion-side groove 121e and of the outer lip portion 121c as shown in FIG. 7. The brake fluid is, further, fed into the first hydraulic chamber 6 passing through the groove 121f on the inside of the intermediate lip portion, annular recessed portion 4b of the primary piston 4 and the first relief port 17, and the interior of the first hydraulic chamber 6 assumes the atmospheric pressure. Therefore, the primary piston 4 smoothly and quickly returns back.

Being provided with the interference for bringing the intermediate lip portion 121d of the first seal member 121 into contact with the lip portion-side wall 120c of the first recessed portion 120 at all times, as described above, it is allowed to prevent the motion of the first seal member 121 at the time of the piston stroke and to decrease the instability of operation and loss of force. Moreover, since the tapered portion 120d is provided for the lip portion-side wall 120c of the first recessed portion 120, the first seal member 121 can be easily inserted, contributing to improving the assembly, and the fluid feed performance is improved. Moreover, the first seal member 121 is a cup seal of nearly the E-shape. The cup seal of nearly the E-shape has the intermediate lip portion 121d with the interference that comes in contact with the lip portion-side wall 120c. Therefore, the contact is attained nearly at an intermediate portion of the lip portion-side wall 120c of the first recessed portion 120, enabling the first seal member 121 to be more stabilized than when coming in contact at an end portion. Further, the interference of the intermediate lip portion 121d is partly arranged in the circumferential direction, contributing to improving the flow of fluid. Further, the tapered portion 120d is so formed that the gap between the base portion-side wall 120a and the lip portion-side wall 120c becomes narrow toward the bottom wall 120c of the first recessed portion 120, facilitating the insertion.

Figure 8:
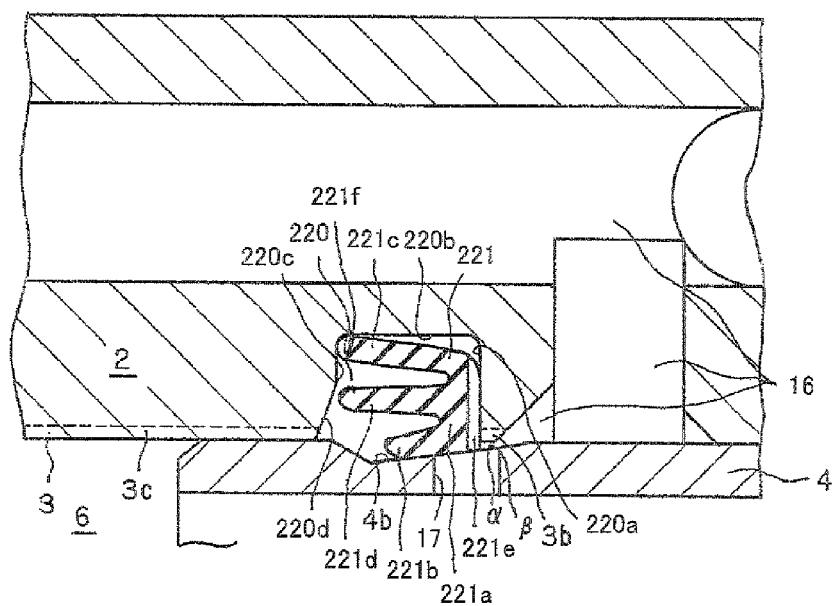
FIG. 8 is a view illustrating a third embodiment.

In this embodiment, the intermediate lip portion 121d of the first seal member 121 of nearly the E-shape is brought into contact with the lip portion-side wall 120c of the first recessed portion 120 at all times. According to a third embodiment which is shown in FIG. 8, further, the other lip portion may be brought into contact with the lip portion-side wall 220c. According to a fourth embodiment as shown in FIG. 9, further, the first seal member 321 may be formed in a U-shape. In this case, either lip portion may be brought into contact with the lip portion-side wall 320c as shown in FIGS. 9(a) and (b).

In the third embodiment shown in FIG. 8 and in the fourth embodiment shown in FIG. 9, reference numerals of two hundreds and three hundreds are used, respectively. Concerning the portions which are not specifically designated, however, common numerals of tens or smaller apply in the hundreds of the second embodiment, in the two hundreds of the third embodiment and in the three hundreds of the fourth embodiment.

Further, the master cylinder of the present invention is not limited to the master cylinder of a brake device only, but can be applied to a master cylinder of a clutch device as well as to any hydraulic devices provided they generate a hydraulic pressure in the hydraulic chamber accompanying the forward motion of the piston. Further, the above embodiments have described tandem master cylinders in which two pistons are arranged in series. However, the master cylinder of the present invention can be applied to a single master cylinder as well as to any master cylinders provided they are plunger type master cylinders.

INDUSTRIAL APPLICABILITY

The master cylinder according to the present invention can be preferably utilized for a plunger type master cylinder which is provided with a cup seal, generates a hydraulic pressure in the hydraulic chamber when the piston moves forward, and feeds the operation brake fluid into the hydraulic chamber when the piston retracts. In particular, the invention can be preferably utilized for the master cylinders of the brake and clutch in a vehicle such as an automobile.

The invention claimed is:

1. A cup seal held in a recessed portion of a cylinder having a tapered surface, in which an open end portion of a side wall expands toward an open end, and formed in a U-shape in cross section, comprising:
    an annular base portion extending in a radial direction and through which a slide member penetrates so as to slide;
    an annular inner lip portion extending in the axial direction from an inner peripheral end of the base portion and through which the slide member penetrates so as to slide; and
    an annular outer lip portion extending in the axial direction from an outer peripheral end of the base portion and coming in detachable contact with a bottom wall of a recessed portion;
    wherein the inner lip portion has an inner peripheral surface which at least includes a first tapered inner peripheral surface which extends in a manner that an inner diameter thereof gradually decreases forward in the axial direction from the inner peripheral end of the base portion, the inner peripheral surface has a second tapered inner peripheral surface which extends in a manner that an inner diameter thereof gradually increases forward in the axial direction from the first tapered inner peripheral surface; and
    a projection protrudes in the axial direction at a tip portion of the inner lip portion so as to determine a position in the axial direction when the tip portion of the inner lip portion comes in contact with an opposing side wall having a tapered surface with an open end portion expanding toward the open end of the recessed portion.

2. A master cylinder comprising a cylinder body having a cylinder hole; a piston inserted in the cylinder hole so as to slide to thereby divide a hydraulic chamber; a connecting passage provided in the cylinder body and connected to a reservoir; a relief port formed in the piston, connected to the hydraulic chamber at all times and which connects the connecting passage to the hydraulic chamber; and a seal member held in a cylinder-side recessed portion in an inner peripheral surface of the cylinder hole of the cylinder body and through which the piston penetrates so as to slide while attaining sealing between the inner peripheral surface of the cylinder hole and an outer peripheral surface of the piston, enabling the connecting passage to be connected to the relief port when not in operation and, when in operation, causing the piston to move so that the connecting passage is shut off from the relief port by the seal member;
    wherein a piston-side recessed portion having a tapered surface is formed in the outer peripheral surface of the piston;
    the seal member is constituted by the cup seal according to claim 1; and
    the projection of the inner lip portion comes in contact with the side wall of the recessed portion to which the tip portion of the inner lip portion faces, whereby the cup seal is positioned in the axial direction while being prevented from moving in the axial direction, and the tapered surface of the piston-side recessed portion is allowed to come in contact with the first tapered inner peripheral surface of the inner lip portion in the axial direction.

3. A master cylinder comprising a cylinder body having a cylinder hole; a piston inserted in the cylinder hole so as to slide to thereby divide a hydraulic chamber; a connecting passage provided in the cylinder body and connected to a reservoir; a relief port formed in the piston, connected to the hydraulic chamber at all times and which connects the connecting passage to the hydraulic chamber; and a seal member held in a recessed portion in an inner peripheral surface of the cylinder hole of the cylinder body and through which the piston penetrates so as to slide while attaining sealing between the inner peripheral surface of the cylinder hole and an outer peripheral surface of the piston, enabling the connecting passage to be connected to the relief port when not in operation and, when in operation, causing the piston to move so that the connecting passage is shut off from the relief port by the seal member; wherein the seal member has a base portion that comes in contact with the base portion-side wall of the recessed portion in the inner peripheral surface of the cylinder hole of the cylinder body and, further, has at least one lip portion with an interference that comes in contact with a lip portion-side wall of the recessed portion in the inner peripheral surface of the cylinder hole of the cylinder body at all times,
    wherein the lip portion-side wall of the recessed portion in the inner peripheral surface of the cylinder hole of the cylinder body has a tapered portion formed in a tapered shape, in which an open end portion expands toward the open end, the lip portion comes in contact with tapered portion.

4. The master cylinder according to claim 3, wherein the tapered portion is so formed that a gap between the base portion-side wall and the lip portion-side wall becomes narrow toward a bottom wall of the recessed portion.

5. The master cylinder according to claim 3, wherein the seal member is a cup seal of nearly an E-shape in cross section, and the cup seal of the E-shape is provided with an intermediate lip portion having the interference that comes in contact with the lip portion-side wall.

6. The master cylinder according to claim 4, wherein the seal member is a cup seal of nearly an E-shape in cross section, and the cup seal of the E-shape is provided with an intermediate lip portion having the interference that comes in contact with the lip portion-side wall.

7. The master cylinder according to claim 5, wherein the interference of the intermediate lip portion is partly arranged in a circumferential direction.

8. The master cylinder according to claim 6, wherein the interference of the intermediate lip portion is partly arranged in a circumferential direction.

\* \* \* \* \*